(12) United States Patent
Weilert et al.

(10) Patent No.: US 12,196,424 B2
(45) Date of Patent: Jan. 14, 2025

(54) HEAT DEFLECTOR

(71) Applicant: Solo Brands, LLC, Grapevine, TX (US)

(72) Inventors: Jeffrey R. Weilert, Southlake, TX (US); Alexander K. Maghsadi, Fort Worth, TX (US)

(73) Assignee: Solo Brands, LLC, Grapevine, TX (US)

( * ) Notice: Subject to any disclaimer, the term of this patent is extended or adjusted under 35 U.S.C. 154(b) by 0 days.

(21) Appl. No.: 18/424,315

(22) Filed: Jan. 26, 2024

(65) Prior Publication Data

US 2024/0167682 A1    May 23, 2024

Related U.S. Application Data

(63) Continuation of application No. 17/525,686, filed on Nov. 12, 2021, now Pat. No. 11,920,798.

(51) Int. Cl.
*F24B 1/195* (2006.01)
*A47J 37/06* (2006.01)
(Continued)

(52) U.S. Cl.
CPC ............ *F24B 1/1957* (2013.01); *F24B 1/192* (2013.01); *F24B 3/00* (2013.01); *A47J 37/0635* (2013.01);
(Continued)

(58) Field of Classification Search
CPC .................................................... F24B 1/1957
See application file for complete search history.

(56) References Cited

U.S. PATENT DOCUMENTS

| 844,583 A | 2/1907 | Dixon |
| 913,068 A | 2/1909 | St Hoor |

(Continued)

FOREIGN PATENT DOCUMENTS

| CN | 2274728 Y | 2/1998 |
| CN | 217685133 U | 10/2022 |

(Continued)

OTHER PUBLICATIONS

Translation of KR101847775B1.*

(Continued)

*Primary Examiner* — Edelmira Bosques
*Assistant Examiner* — Deepak A Deean
(74) *Attorney, Agent, or Firm* — Haynes and Boone, LLP

(57) ABSTRACT

A heat deflector is disclosed that includes a first portion having a first outer edge and a center and a first surface extending from the first outer edge to the center of the first portion. The first surface sloping downward from the first outer edge toward the center of the first portion. The heat deflector further includes a second portion having an inner edge and an outer edge. The inner edge of the second portion is adjacent to the first outer edge of the first portion. The heat deflector further includes a third portion having a third outer edge and a third inner edge and a second surface extending from the third outer edge of the third portion to the third inner edge of the third portion. The second surface sloping downward from the third outer edge of the third portion to the third inner edge of the third portion.

28 Claims, 16 Drawing Sheets

(51) Int. Cl.
   *F24B 1/18*   (2006.01)
   *F24B 1/192*  (2006.01)
   *F24B 3/00*   (2006.01)
   *F24B 13/00*  (2006.01)
(52) U.S. Cl.
   CPC ............. *A47J 37/0652* (2013.01); *F24B 1/18* (2013.01); *F24B 13/00* (2013.01)

(56) References Cited

U.S. PATENT DOCUMENTS

| | | | |
|---|---|---|---|
| 1,725,974 A | 8/1929 | Brautigam | |
| 1,935,845 A | 11/1933 | Hader | |
| D124,771 S | 1/1941 | Alder | |
| 2,257,834 A | 10/1941 | Behee | |
| 2,985,137 A | 5/1961 | Horne | |
| 3,040,651 A | 6/1962 | Nolte, Jr. | |
| 3,174,532 A | 3/1965 | Ferree | |
| 3,177,344 A | 4/1965 | Morey | |
| 3,266,821 A | 8/1966 | William | |
| 3,503,379 A | 3/1970 | Kuhn | |
| 3,869,987 A | 3/1975 | Berchielli | |
| D245,623 S | 8/1977 | Jenkins | |
| 4,509,776 A | 4/1985 | Yoshida | |
| 4,600,219 A | 7/1986 | Yoshida | |
| 5,375,801 A | 12/1994 | Porter | |
| 5,431,091 A * | 7/1995 | Couture | A47J 36/26 |
| | | | 99/425 |
| 5,964,233 A * | 10/1999 | Clark | F24C 1/12 |
| | | | 135/92 |
| 6,073,642 A | 6/2000 | Huang | |
| 6,102,031 A | 8/2000 | Waters | |
| 6,164,273 A | 12/2000 | Waters | |
| 6,213,006 B1 | 4/2001 | Reardon | |
| 6,487,977 B1 | 12/2002 | Williams | |
| 6,578,568 B1 | 6/2003 | Dufort | |
| 7,533,487 B1 | 5/2009 | Mantkowski | |
| 7,828,002 B2 | 11/2010 | Boldsen | |
| D637,446 S | 5/2011 | McMillian | |
| 8,327,834 B1 | 12/2012 | Judge | |
| 8,696,416 B1 * | 4/2014 | Arnold, Jr. | F23L 17/04 |
| | | | 454/12 |
| 8,770,186 B2 | 7/2014 | Clue | |
| 9,814,353 B2 | 11/2017 | Denham | |
| D961,747 S | 8/2022 | Strange | |
| 11,859,827 B1 * | 1/2024 | Redlinski | F24B 1/1957 |
| 11,920,798 B2 * | 3/2024 | Weilert | F24B 3/00 |
| 12,060,998 B1 * | 8/2024 | Ressler | F24B 15/007 |
| 2001/0037804 A1 * | 11/2001 | Waters | F24C 1/12 |
| | | | 126/92 R |
| 2002/0023636 A1 | 2/2002 | Ashton | |
| 2003/0029439 A1 | 2/2003 | Bossler | |
| 2003/0041855 A1 | 3/2003 | Grady | |
| 2003/0056782 A1 | 3/2003 | Liang | |
| 2004/0226551 A1 * | 11/2004 | Duphily | F23D 14/46 |
| | | | 126/92 B |
| 2004/0261780 A1 | 12/2004 | Frink | |
| 2007/0001068 A1 | 1/2007 | Catalina | |
| 2008/0196708 A1 | 8/2008 | Lee | |
| 2008/0272107 A1 * | 11/2008 | Maitland | F24H 3/0488 |
| | | | 219/218 |
| 2009/0000303 A1 * | 1/2009 | Patel | F23R 3/002 |
| | | | 29/890.03 |
| 2010/0132698 A1 | 6/2010 | Pedersen | |
| 2011/0253876 A1 | 10/2011 | Odell | |
| 2013/0239943 A1 | 9/2013 | James | |
| 2014/0220293 A1 | 8/2014 | Lavigna | |
| 2015/0196163 A1 | 7/2015 | Robles | |
| 2016/0230985 A1 | 8/2016 | Home | |
| 2017/0251875 A1 | 9/2017 | Robinson | |
| 2018/0156466 A1 * | 6/2018 | Spalding | F24B 1/1957 |
| 2021/0045578 A1 * | 2/2021 | Stoltzfus | F24B 1/191 |
| 2021/0048188 A1 * | 2/2021 | Harrington | F24B 5/026 |
| 2022/0349582 A1 * | 11/2022 | Stoltzfus | F24B 13/02 |
| 2022/0364732 A1 * | 11/2022 | Ressler | F24B 1/192 |
| 2023/0243518 A1 | 8/2023 | Dadoyan | |
| 2023/0296254 A1 * | 9/2023 | Ressler | F24B 1/1957 |
| | | | 126/552 |
| 2024/0027072 A1 * | 1/2024 | Ressler | F24C 15/086 |
| 2024/0035662 A1 * | 2/2024 | Stoltzfus | A47J 37/07 |
| 2024/0219030 A1 * | 7/2024 | Harmeling | F24B 1/1957 |

FOREIGN PATENT DOCUMENTS

| | | |
|---|---|---|
| DE | 29515261 U1 | 11/1995 |
| DE | 102019108922 A1 | 10/2019 |
| EP | 0976979 A1 | 2/2000 |
| GB | 155426 A | 12/1920 |
| JP | 2006230931 A | 9/2006 |
| KR | 200419051 Y1 | 6/2006 |
| KR | 101847775 B1 * | 4/2017 |
| WO | 2005087036 A1 | 9/2005 |
| WO | 2006118395 A1 | 11/2006 |

OTHER PUBLICATIONS

"Google Search—Prior Art Web Search Printable History Generator 2023-11-15.pdf", Google Search, Nov. 15, 2023. (Year: 2023).

"Google—28 Fire Pit Heat Deflector _ Reflector and Cover for— Etsy 2021.pdf", https://www.etsy.com #36 Fire Pit Heat Deflector, Nov. 15, 2023. (Year: 2023).

"Google—28 Fire Pit Heat Deflector _ Reflector and Cover for— Etsy 2021.pdf", https://www.etsy.com #28 Fire Pit Heat Deflector, Nov. 15, 2023. (Year: 2023).

"Google—Heat Deflector _ Solo Stove.pdf", https://www.solostove.com Heat Deflector, Nov. 15, 2023. (Year: 2023).

"Google—Outpost™ Heat Deflector.pdf", https://breeo.co Output(tm) Heat Deflector, Nov. 15, 2023. (Year: 2023).

"Hisencn Heat Deflector and Handle Accessory for Solo Stove Bonfire Fire Pit, with 3 Legs and Carrying Handles, 304 Stainless Steel Accessory for Solo Stove Bonfire 19.5" Portable Fire Pit," 7 pages. Retrieved from Internet: https://www.amazon.com/H isencn-Deflector-Accessory-Carrying-Stainless/ d p/B0CMXMZGK C?ref _ = ast_sto _ d p on Nov. 16, 2023.

The Vevor Store, Vevor Fire Pit Heat Deflector 24 x 24 x 13 Inch, Stainless Steel Fire Pit Cover 1.5mm Thick, Square Fire Pit Burner Cover to Push Heat Down and Out, Fire Pit Lid with Foldable Legs and Carrying Handle, 10 pages, https://www.amazon.com/VEVOR-Deflector-Stainless-Foldable-Carrying/dp/B096S17YXD/ref=sr_1_ 5?dchild=1&keywords=fire+pit+heat+deflector&qid=1634764012 &sr=8-5.

Heat Warden, Heat Warden USA Heat Deflector (American Made) to Push Heat Down and Out to Warm Friends and Family. Plus, Deflects Heat from Your Patio Roof, 9 pages, https://www.amazon.com/Heat-Warden-Deflector-Friends-Family/dp/B07LC7L3FN/ref= sr_1_3?dchild=1&keywords=fire+pit+heat+deflector&qid=1634764012 &sr=8-3.

Fire Pits Direct.com, The Outdoor Plus OPT-RCB17HRF Black Steel Cone Fire Pit Cover with Heat Reflector, 17-Inch by the Outdoor Plus, 4 pages, https://www.firepitsdirect.com/the-outdoor-plus-opt-rcb17hrf-black-steel-cone-fire-pit-cover-with-heat-reflector-17-inch.html?gclid=CjwKCAjw_L6LBhBbEiwA4c46urVjeluD44z iAmsBHzdGEWSs8tEajDpRQIFb7bP4Nr06ggYZ1YCusBoCht sQAvD_BwE.

HigleyWelding, Fire Pit Heat Deflector 39"Diameter Cover—35" Dia Frame/Stand, 3 pages, https://www.etsy.com/listing/668402735/ fire-pit-heat-deflector-39diameter-cover?gpla=1&gao=1&&utm_ source=google&utm_medium=cpc&utm_campaign=shopping_us_ a-home_and_living-outdoor_and_garden-fire_pits-fire_pits&utm_ custom1=k_CjwKCAjw_L6LBhBbEiwA4c46us5KgiLVW_2newp 4DcQ1GIXG39bXeqi0ebmPftbCPSZglvf8xzqaWROC3wsQAvD_ BwE_k_&utm_content=go_12570712527_123240178047_ 507395012356_pla-308555950715_c_668402735_1067624.

Korean Intellectual Property Office, International Search Report and Written Opinion of the International Searching Authority, PCT/ US2022/049496, Mar. 15, 2023, 10 pages.

* cited by examiner

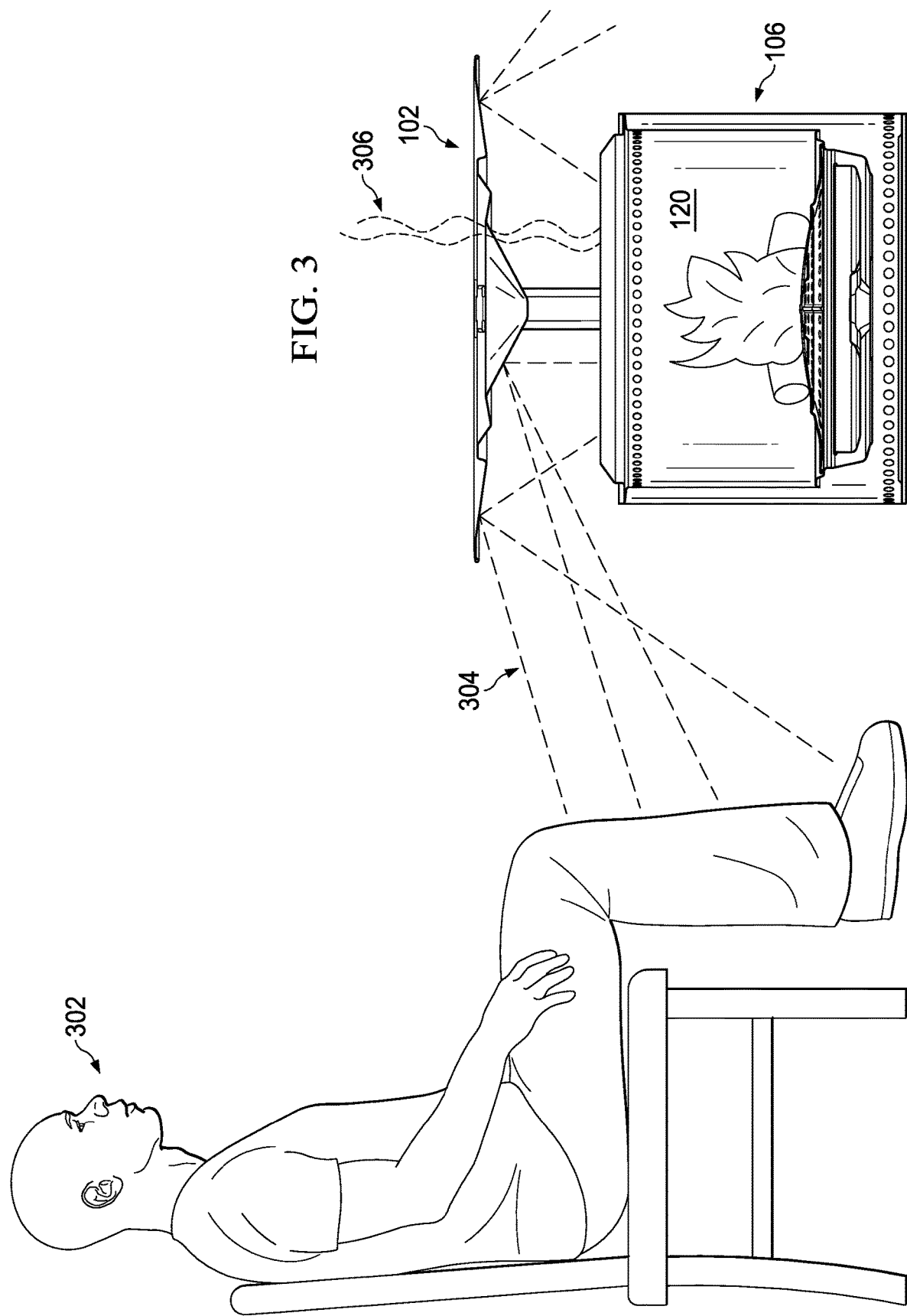

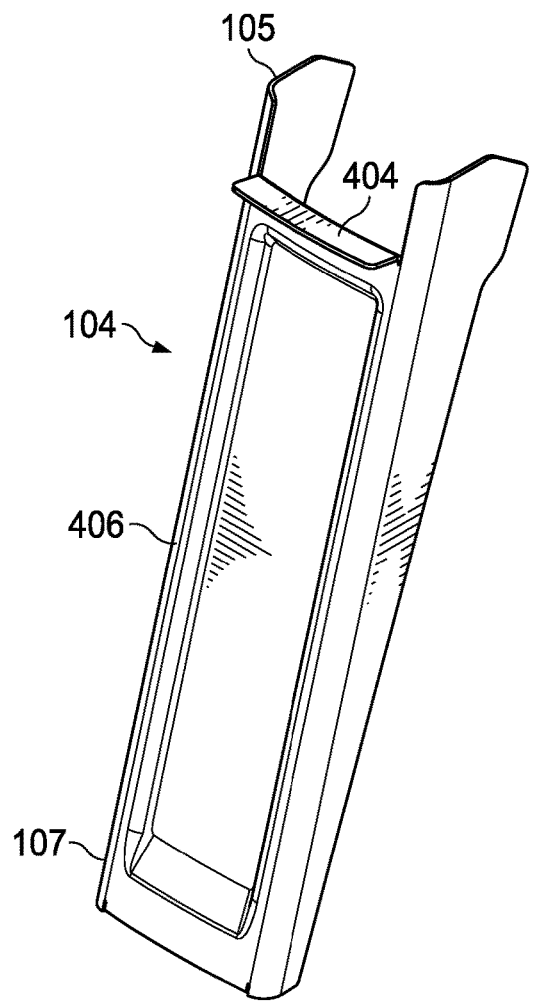
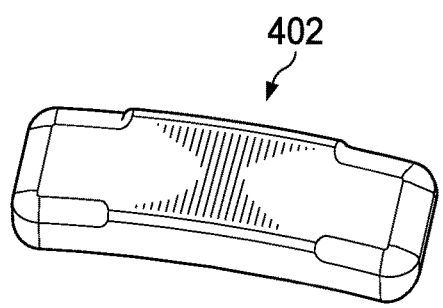
FIG. 4B
FIG. 4C

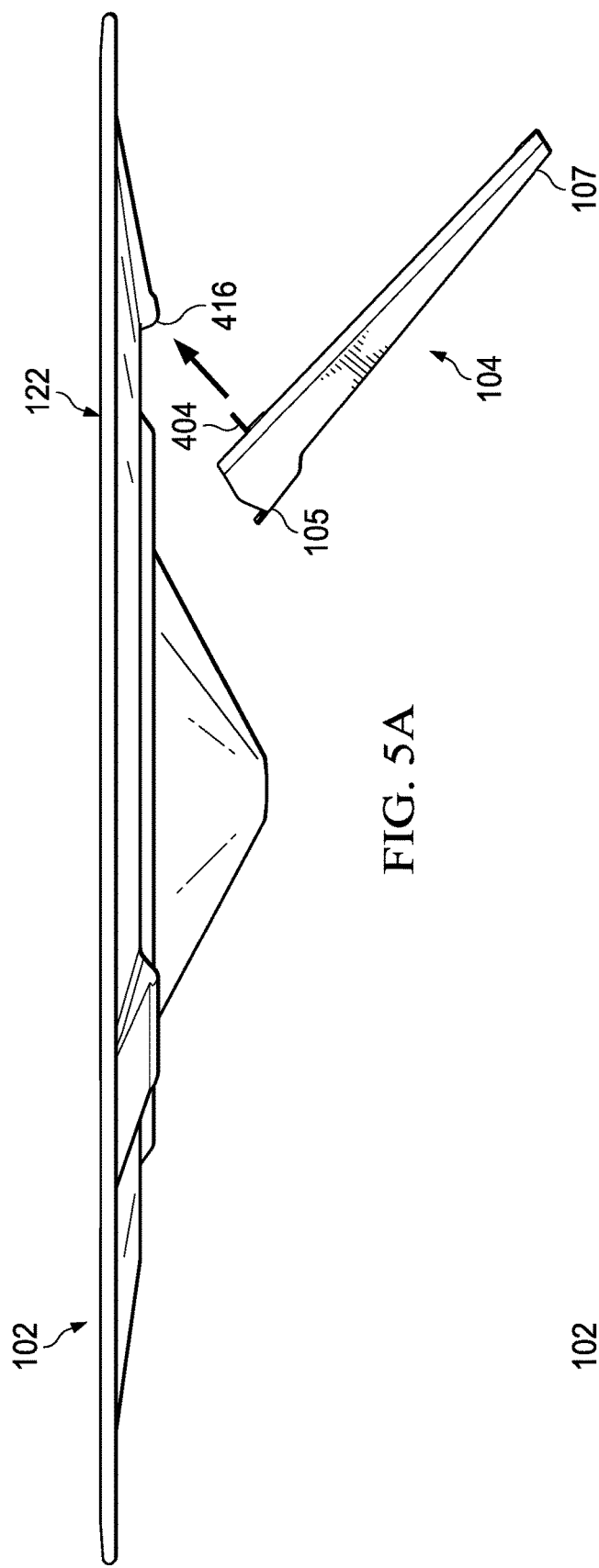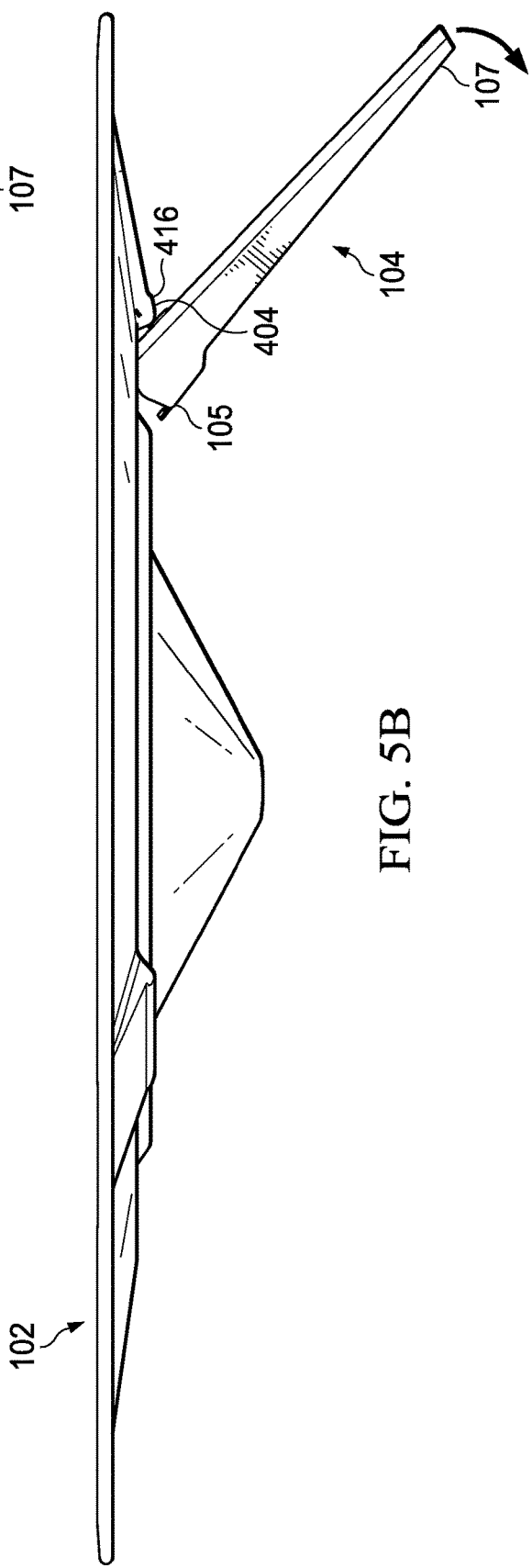

HEAT DEFLECTOR

CROSS-REFERENCE TO RELATED APPLICATION

This application is a continuation of U.S. patent application Ser. No. 17/525,686, filed Nov. 12, 2021, titled HEAT DEFLECTOR, the entire disclosure of which is hereby incorporated herein by reference.

This application is related to U.S. Design patent application Ser. No. 29/815,373, filed Nov. 12, 2021, titled DEVICE FOR FIRE PIT, the entire disclosure of which is hereby incorporated herein by reference.

TECHNICAL FIELD

The subject matter described herein relates to a combustible fuel burning fire pit and a removable heat deflector.

BACKGROUND

Portable wood burning fire pits may be used in camping, in residential back yards for recreation, or in other applications. The fire pits may provide outdoor heat and may support cooking, creating an ambiance, and may be used for any desirable purpose.

Large fire pits are generally fueled by piles of logs or combustible materials. Heat from the fire pit rises mostly upward with some lateral radiation of heat. A heat deflector may therefore be place over the fire pit to increase the lateral radiation of heat from the fire pit so that people sitting around the firepit can receive some of the heat. Current heat deflector designs may be large and heavy, making them challenging to move. Furthermore, current designs may not effectively redirect the heat of the fire pit. Additionally, current designs may reduce the efficiency of the fire pit.

It is therefore to be appreciated that such commonly used heat deflectors could be improved. Accordingly, a need exists for heat deflectors that improve the performance and efficiency of deflecting the heat generated by the fire pit that address the forgoing and other concerns.

SUMMARY

Disclosed is a heat deflector for a fire pit. In some implementations, the heat deflector includes removable legs.

One general aspect includes heat deflector including a first portion having a first outer edge and a center, and having a first surface extending from the first outer edge to the center of the first portion. The first surface may slope downward from the first outer edge toward the center of the first portion. A second portion may have a second inner edge and a second outer edge. The second inner edge of the second portion may be adjacent to the first outer edge of the first portion. A third portion may have a third outer edge and a third inner edge. The heat deflector may have a second surface extending from the third outer edge of the third portion to the third inner edge of the third portion. The second surface may slope downward from the third outer edge of the third portion to the third inner edge of the third portion.

Some example implementations may include one or more of the following features. In some embodiments, the heat deflector further includes a plurality of holes formed in the second portion, the plurality of holes sized to permit passage of air through the second portion. In some embodiments, the heat deflector further includes one or more ribbed features formed in the third portion, the one or more ribbed being configured to improve resistance of the heat deflector to deformation. In some embodiments, the heat deflector further includes one or more legs, a top portion of each of the one or more legs being shaped to pass through the second portion and secure to the heat deflector, each of the legs being removable from the heat deflector. In some embodiments, the heat deflector further includes a hole formed in the center of the first portion. In some embodiments, the slope of the first portion has a first angle, and the slope of the third portion has a second angle that is smaller than the first angle. In some embodiments, the first portion has a generally circular shape.

Another general aspect may include a heat deflector including a cone having a base perimeter, a vertex, and a first surface extending from the vertex to the base perimeter, wherein the vertex is below the base perimeter. The heat deflector also may include a first ring extending around the base perimeter, with the first ring having an inner perimeter and an outer perimeter. A plurality of holes may be formed in the first ring. A second ring may extend around the first ring. The second ring may have a second surface that has a first slope extending from an interior edge of the second ring to an exterior edge of the second ring.

Some example implementations may include one or more of the following features. In some embodiments, the first surface has a second slope that is greater than the first slope of the second ring. In some embodiments, the heat deflector further includes a third ring extending from the first ring to the second ring, the third ring including a raised surface; an opening in the third ring; and a leg having an upper portion, the upper portion of the leg extending through the opening in the third ring. In some embodiments, the heat deflector further includes one or more structural support features formed in the second surface of the second ring. In some embodiments, the heat deflector further includes a hole formed in vertex of the cone. In some embodiments, the heat deflector is formed of a single stamped piece of metal. In some embodiments, the cone and the second ring are operable to laterally deflect upward radiating heat. In some embodiments, the heat deflector further includes a third ring extending from the first ring to the second ring, the third ring including a raised surface, wherein the raised surface of the third ring receives a support post for installing the heat deflector.

Yet another general aspect includes a heat deflector including a plurality of concentric rings and a cone located within an inner ring of the plurality of concentric rings. The cone may have a first surface with a first slope from the inner ring to a vertex of the cone. An outermost ring of the plurality of concentric rings may have a second surface. The second surface may have a second slope from an outer edge of the outermost ring to toward the center of the outermost ring. The first slope may be greater than the second slope. A leg may removably attach to one of the inner ring and the outermost ring.

Some example implementations may include one or more of the following features. In some embodiments, the heat deflector further includes a plurality of holes formed in a middle ring of the plurality of rings, the middle ring being between the inner ring and the outermost ring. In some embodiments, the heat deflector further includes a cap to secure the leg to the heat deflector. In some embodiments, the heat deflector further includes a raised ring of the plurality of concentric rings, the raised ring being between the inner ring and the outermost ring; and an opening in a sidewall of the raised ring through which the leg is attachable to the heat deflector. In some embodiments, the heat deflector further includes one or more structural features formed in the outermost ring to resist warping the heat deflector during heating and cooling cycles.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the heat deflector, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 3 is a side view of an example radiant energy from the heat deflector connected to the combustion fire pit, according to some embodiments of the present disclosure.

FIGS. 4A-4E are illustrative views of an example heat deflector and removable leg components, according to some embodiments of the present disclosure.

FIGS. 5A-5C are illustrative side views of attaching a removable leg to a heat deflector, according to some embodiments of the present disclosure.

DETAILED DESCRIPTION

Figure 1A:
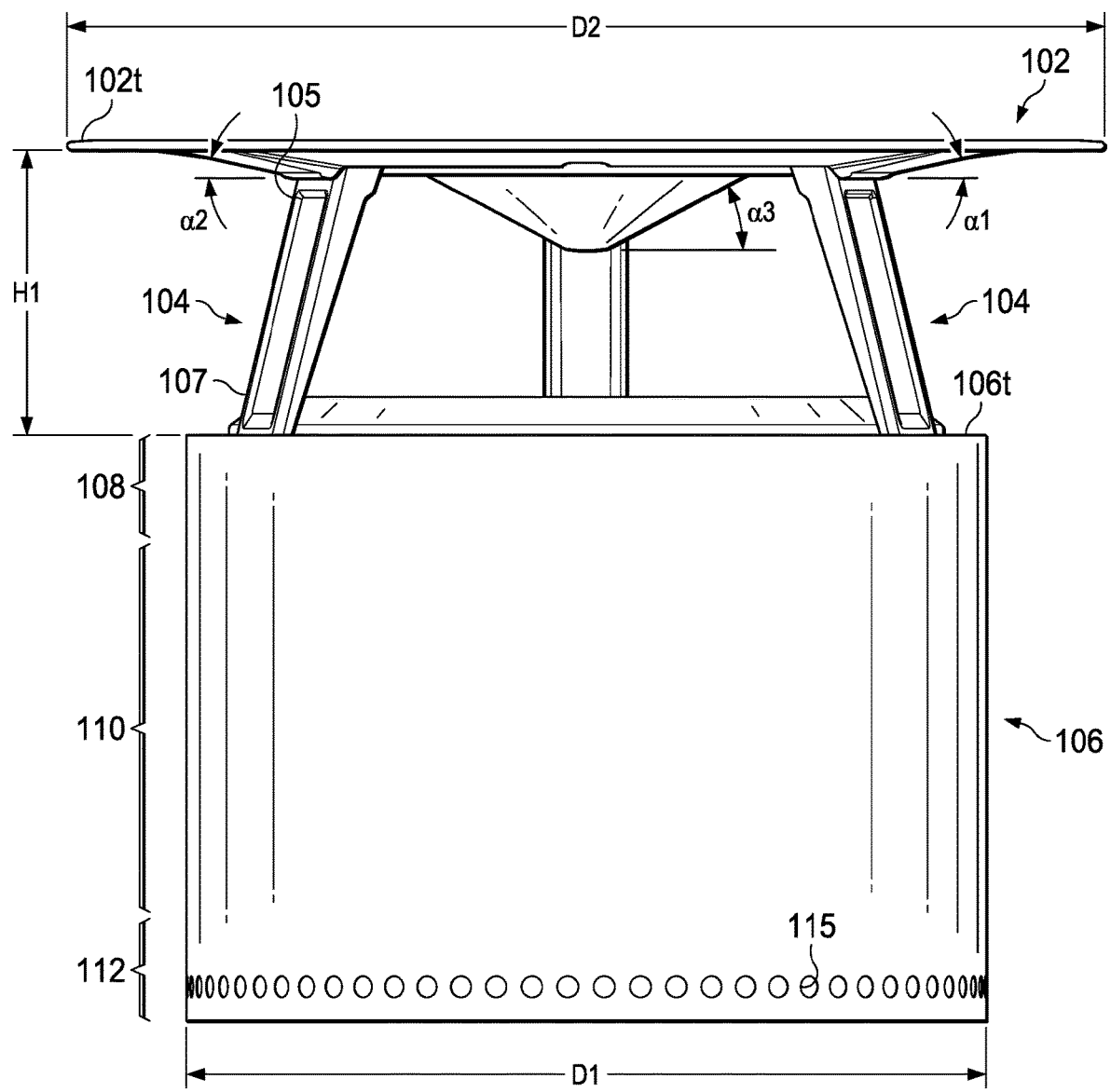
FIGS. 1A and 1B are side and perspective views respectively of an example heat deflector disposed on a combustion fire pit using removable legs, according to some embodiments of the present disclosure.

In accordance with at least one embodiment of the present disclosure, a heat deflector is provided which includes novel structural features to laterally redirect upward moving radiant energy and improve the strength of the heat deflector. The disclosed heat deflector also includes air flow features conducive to reducing back pressure on the fire pit caused by the presence of the heat deflector. The air flow features allow smoke and some heated air to pass upwardly through the heat deflector, which may reduce back pressure and increase the air-flow and therefore increase the heat and energy output from the first pit. Further features provide for portability and modular installation of the heat deflector. In some examples, the heat deflector may be installed on the fire pit through the use of removable legs, a hub, or other components.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes only, and should not be considered to limit the scope of the heat deflector, removable legs, hub, or fire pit. Certain features may be added, removed, or modified without departing from the spirit of the claimed subject matter.

Figure 1B:
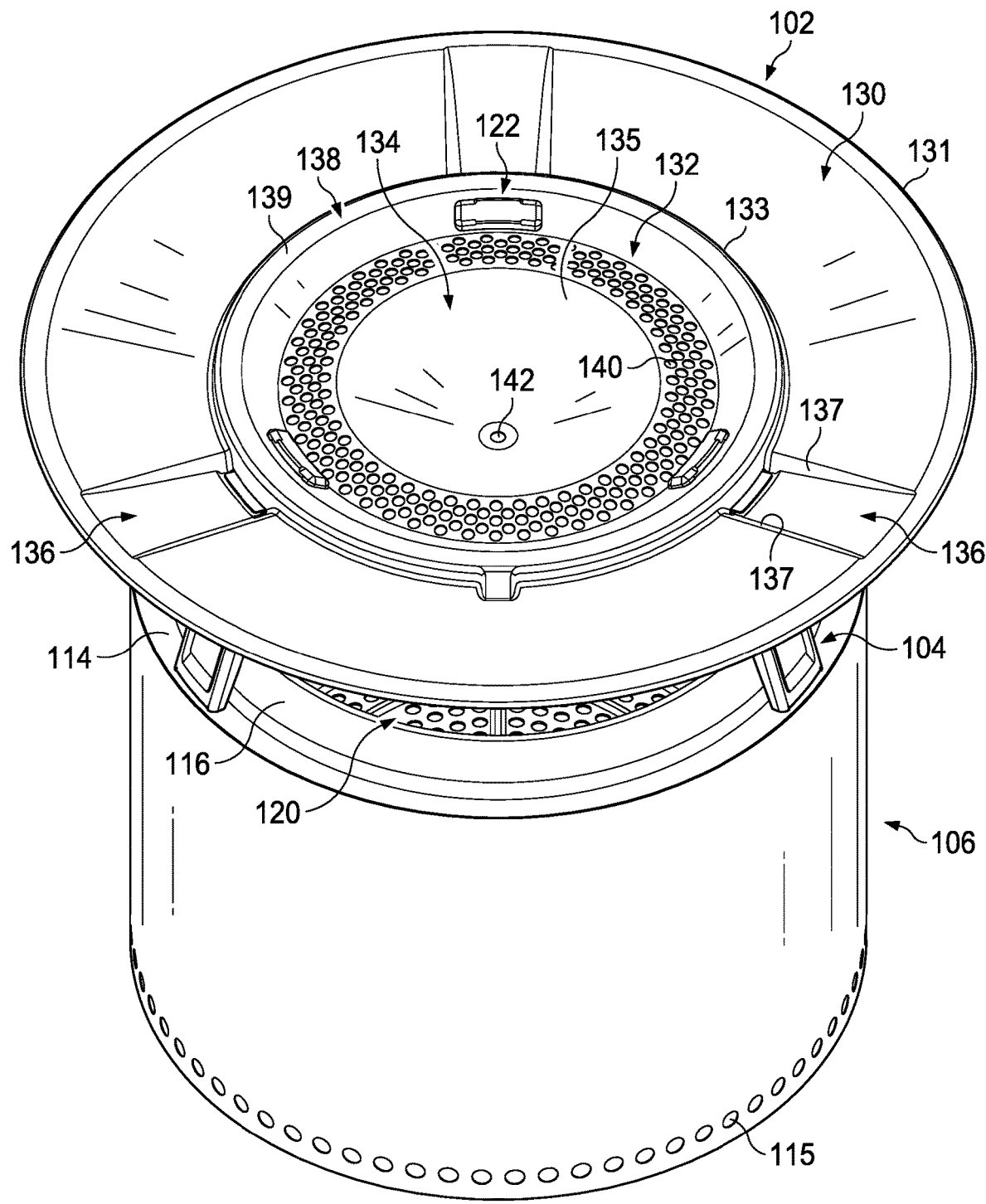

FIGS. 1A and 1B are a side view and a perspective view, respectively, of an exemplary heat deflector 102 disposed on an exemplary fire pit using removable legs in accordance with some embodiments of the present disclosure. FIG. 4D shows a cross-sectional view of the main body of the heat deflector 102. The heat deflector 102 may include removable legs 104, and is shown on a fire pit 106. The fire pit 106 may be an example of the fire pit described in U.S. application Ser. No. 17/169,269 entitled "Combustible Fuel Burning Fire Pit with Removable Fire Grate and Ash Pan" filed on Feb. 5, 2021, which is incorporated herein by reference in its entirety. The fire pit 106 includes an interior wall and an exterior wall with an air gap between the interior wall and the exterior wall. With reference to FIGS. 1A and 1B, the fire pit 106 includes a combustion chamber 120 and is divided into a top portion 108, a middle portion 110, and a bottom portion 112. In some example implementations, the fire pit 106 is round or has a cylindrical shape with a diameter or width D1 that may be about 250 mm to about 800 mm. In some examples, width D1 may be about 350 mm to about 700 mm. In such implementations, the heat deflector 102 also may be round and may have a diameter or width D2 that is greater than D1. Depending on the implementation, the width D2 may be about 400 mm to about 900 mm. In some examples, the width D2 may be about 500 mm to about 800 mm Although larger and smaller sizes of the fire pit 106 and the heat deflector 102 are also contemplated. Also depending on the implementation, the ratio of the width of the heat deflector to the diameter or width of the firepit may be within a range of about 1:1 to 1.3:1. Although larger and smaller ratios are also contemplated.

The top surface 102t of the heat deflector 102 may be at height H1 above a top surface 106t of the fire pit 106 to maximize the deflection of the radiant energy from the combustion chamber 120 of the fire pit 106. The height H1 may be about 150 mm to about 915 mm. In some examples, the height H1 may be about 225 mm to about 750 mm. In some embodiments, the ratio of the of the height H1 to the width D2 is in the range of about 2.5:1 to 5:1. Yet other ratios are contemplated.

The top portion 108 of the fire pit 106 includes a connecting ring 114, a top lip 116, and a plurality of top ventilation holes (not shown) inside the combustion chamber 120, along the interior wall of the fire pit 106. The connecting ring 114 is a horizontal surface extending from the interior wall to the exterior wall of fire pit 106. The connecting ring 114 may be used to interface with the removable legs of the heat deflector 102 to the fire pit 106. The top lip 116 is located along the inner surface of connecting ring 114 and adjacent the combustion chamber 120. The top lip 116 may be a guide to properly place the removable legs 104 of the heat deflector 102. Additionally, the top lip 116 may protect the heat deflector 102 from falling off the fire pit 106 by preventing the legs 104 from sliding into the combustion chamber 120. The plurality of top ventilation holes provides air flow for the fire pit and improves the burning of combustible material in the combustion chamber 120 while reducing smoke as described in U.S. application Ser. No. 17/169,269. The plurality of top ventilation holes may be round and punched through the interior sidewall of the fire pit 106. In some embodiments, the plurality of top ventilation holes may be square, rectangular, oval, or another shape. The plurality of top ventilation holes are connected to a plurality of bottom ventilation holes 115 located in the bottom portion 112 of the fire pit 106.

The middle portion 110 of the fire pit 106 includes interior and exterior sidewalls of the fire pit 106. In some implementations, the sidewalls of the fire pit 106 may each be formed of a single sheet of metal. In some embodiments, the sidewalls of the fire pit 106 may be formed of another material. In some embodiments, an air gap exists between the interior sidewall and the exterior sidewall to allow for air to flow from the plurality of bottom ventilation holes 115 to the plurality of top ventilation holes.

The bottom portion 112 of the fire pit 106 includes the plurality of bottom ventilation holes 115. The plurality of bottom ventilation holes 115 may be round and punched through the exterior sidewall of the fire pit 106. In some embodiments, the plurality of bottom ventilation holes 115 may be square, rectangular, oval, or another shape.

The heat deflector 102 includes an outer portion 130, a middle portion 132, and an inner portion 134, that together form a main body. In some implementations, the heat deflector 102's main body (absent the legs) may be formed from a single stamped sheet of metal, such as for example, a stainless steel sheet. In some embodiments, the main body of the heat deflector 102 may be formed by joining two or more pieces together, such as by the use of welds, rivets, bolts, or other means of joining two metal pieces.

The outer portion 130 extends from an outer edge 131 to an inner edge 133. A bottom surface of the outer portion 130 slopes downward from the outer edge 131 toward the inner edge 133 at an angle $\alpha 1$, visible in FIG. 1A. In some embodiments, such as when the main body of the heat deflector 102 is formed of a single sheet, the top surface of the outer portion 130 has the same slope of angle $\alpha 1$. The angle $\alpha 1$ may be about 3° to about 12°. In some examples, the angle $\alpha 1$ may be about 5° to about 10°. Although larger and smaller angles are contemplated. In some implementations, the angle $\alpha 1$ of the outer portion 130 may maximize the angle of incidence of the strongest source of radiant energy in relation to a location on the outer portion 130 of the heat deflector 102, as seen in FIG. 3. For example, fuel burning in the combustion chamber 120 causes radiant energy (e.g., heat) to move upward from the fire pit 106. The heat deflector 102, specifically the outer portion 130, laterally deflects the upward moving radiant energy away from the fire pit 106. The angle $\alpha 1$ of the outer portion 130 may be selected to maximize or provide high lateral deflection of the radiant energy for each location along the outer portion 130 of the heat deflector 102.

In the implementation shown, the outer portion 130 of the heat deflector 102 includes one or more ribs or ribbed features 136. Each rib or ribbed feature 136 may be stamped into the outer portion 130 of the heat deflector. In some embodiments, each ribbed feature 136 may be a separate piece that is joined to the heat deflector through the use of welds, rivets, bolts, or other fastening means. As illustrated, the ribbed feature 136 includes sidewalls 137 and a downward sloping surface having an angle $\alpha 2$ that may be greater than the angle $\alpha 1$ of the outer portion 130 of the heat deflector 102. The angle $\alpha 2$ may be about 5° to about 15°. In some examples, the angle $\alpha 2$ may be about 7° to about 12°. Although larger and smaller angles are contemplated. In some embodiments, the ribbed features 136 are evenly, or equidistantly, spaced around the heat deflector 102. In some other embodiments, the ribbed features 136 are unevenly spaced around the heat deflector 102. In the illustrated embodiments, there are three ribbed features 136 spaced equidistant from each other around the outer portion 130 of the heat deflector 102. The ribbed features 136 may be structural support features that improve the strength and stability of the heat deflector 102. The improved strength may increase resistance to warping, deforming, cracking, and/or breaking that may otherwise be caused by the heating and cooling cycles during use of the heat deflector 102.

The middle portion 132 of the heat deflector 102 extends from the inner edge 133 to an inner edge 135 and includes a raised ring 138 and a plurality of holes 140. The raised ring 138 is located around the outer periphery of the middle portion 132 along the inner edge 133. In some embodiments, the raised ring 138 is about halfway between the outer edge 131 and the center of the heat deflector 102. Here, a top surface 139 of the raised ring 138 is higher than the inner edge 133 of the outer portion 130 of the heat deflector 102. The raised ring 138 includes connection points 122 for attaching the removable legs 104 to the heat deflector 102. The connection points 122 may be slots, apertures, openings, or other engagement features that may enable the removeable legs 104 to engage and attach to the raised ring 138. An upper portion 105 of the removable legs 104 attaches to the heat deflector 102 at connection points 122. A bottom portion 107 of the removable legs 104 attach to the connecting ring 114 of the fire pit 106. In some embodiments, the removable legs 104 rest on the connecting ring 114 and are held in place by the top lip 116 and the weight of the heat deflector. In other embodiments, the removable legs 104 are attached to the connecting ring 114 through the use of a fastener.

Adjacent to and disposed radially inward from the raised ring 138, is a surface comprising the plurality of holes 140. The plurality of holes 140 create an array of passages through the main body of the heat deflector that serves multiple functions. The plurality of holes 140 allow smoke to rise through the heat deflector 102 so that all of the smoke does not have to work its way around the outer edges of the heat deflector 102. Further, the plurality of holes 140 reduces downward pressure on the convective upward air movement from the combustion chamber 120 that is caused by the heat deflector 102. The downward pressure, or back pressure effect, reduces the efficiency of the fire pit 106, and specifically, the combustion chamber 120. Accordingly, the plurality of holes 140 improves the efficiency of the fire pit 106. The improved efficiency may be measured in heat produced, fuel consumption rate, smoke produced, etc. Furthermore, the plurality of holes 140 allow liquid (e.g., rain) to drain from the heat deflector 102. As depicted, the plurality of holes 140 are round in shape. In some embodiments, the plurality of holes 140 may have other shapes. They may be square in shape. In some embodiments, the plurality of holes 140 may be elongated slots. In some embodiments, the plurality of holes 140 may be replaced with a screen that performs the same function. There may be more or fewer holes among the plurality of holes 140 than depicted in FIGS. 1A, 1B, and 4D.

The inner portion 134 of the heat deflector extends from the inner edge 135 to the center of the heat deflector 102. The inner portion 134 has a cone shape with a base downward extending vertex 141 (FIG. 4D). The vertex 141 of the cone within the inner portion 134 may include one or more holes 142. The depicted embodiment includes a single hole 142. The holes 142 allow liquid (e.g., rain) to drain from the inner portion 134 of the heat deflector 102. The hole 142 may also relieve downward pressure on the convective upward air movement that is caused by the heat deflector 102. A bottom surface of the inner portion 134 has an angle α3 that is greater than the angle α1 of the outer portion 130. The angel α3 may be about 20° to about 40°. In some examples, the angle α3 may be about 25° to about 35°. Although larger and smaller angles are contemplated. The angle α3 of the inner portion 134 maximizes the angle of incidence of the strongest source of radiant energy in relation to a location on the inner portion 134 of the heat deflector 102, as seen in FIG. 3. For example, fuel burning in the combustion chamber 120 causes radiant energy (e.g., heat) to move upward from the fire pit 106. The heat deflector 102, specifically the inner portion 134, laterally deflects the upward moving radiant energy away from the fire pit 106. The angle α3 of the inner portion 134 maximizes the lateral deflection of the radiant energy for each location along the inner portion 134 of the heat deflector 102.

Figure 2A:
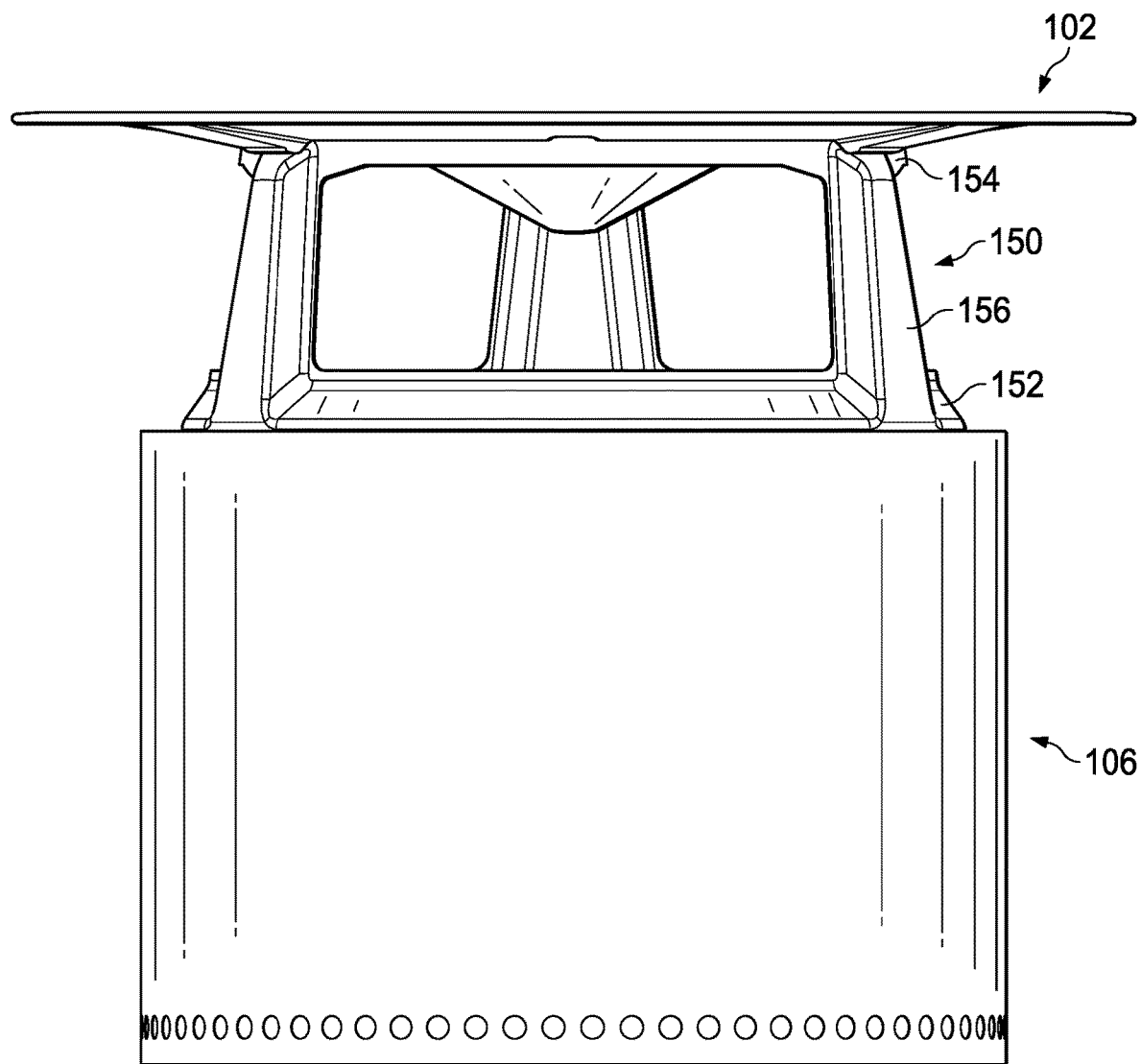
FIGS. 2A-2C are side, perspective, and exploded illustrative views respectively of an example heat deflector disposed on a combustion fire pit using a hub, according to some embodiments of the present disclosure.
Figure 2B:
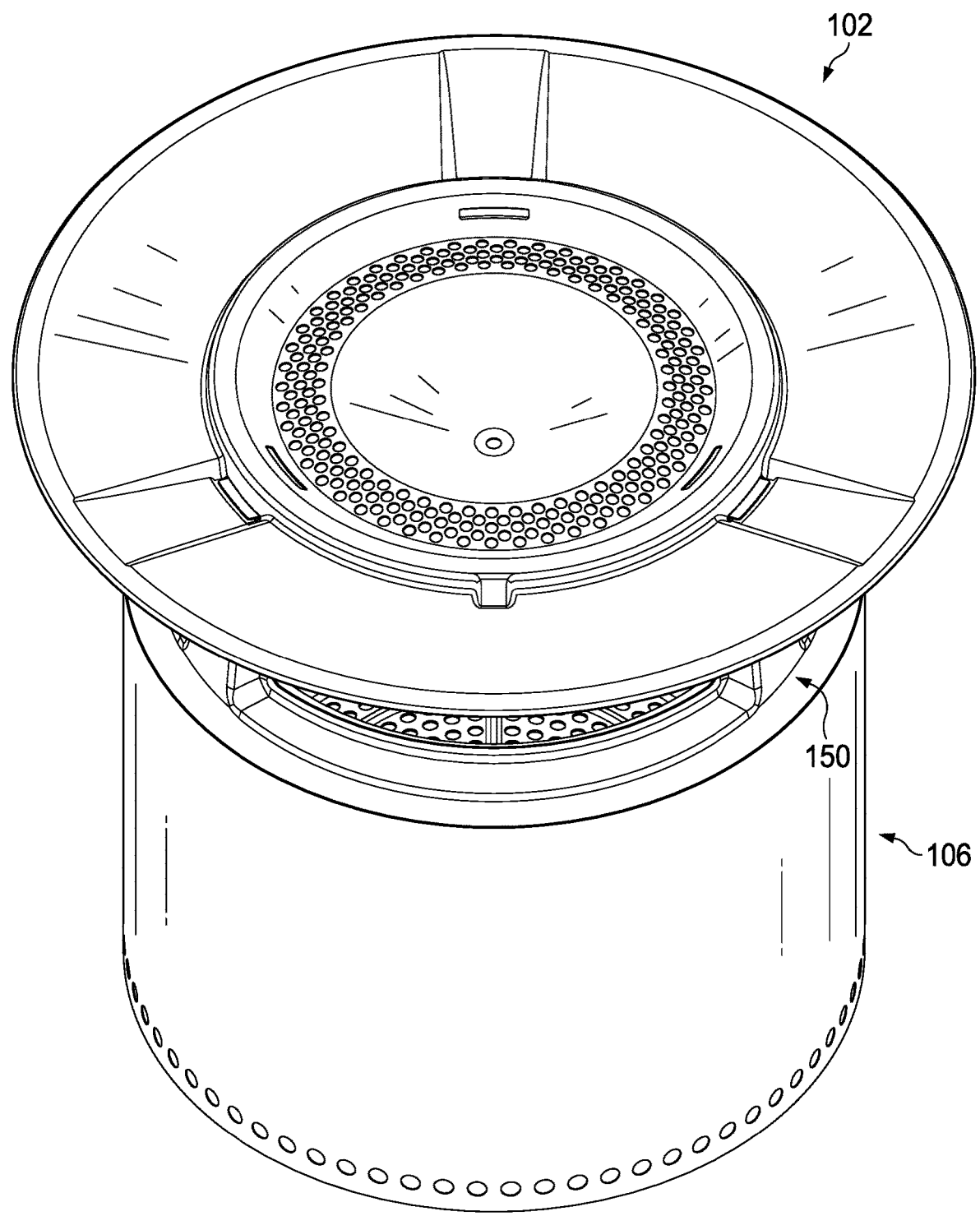
Figure 2C:
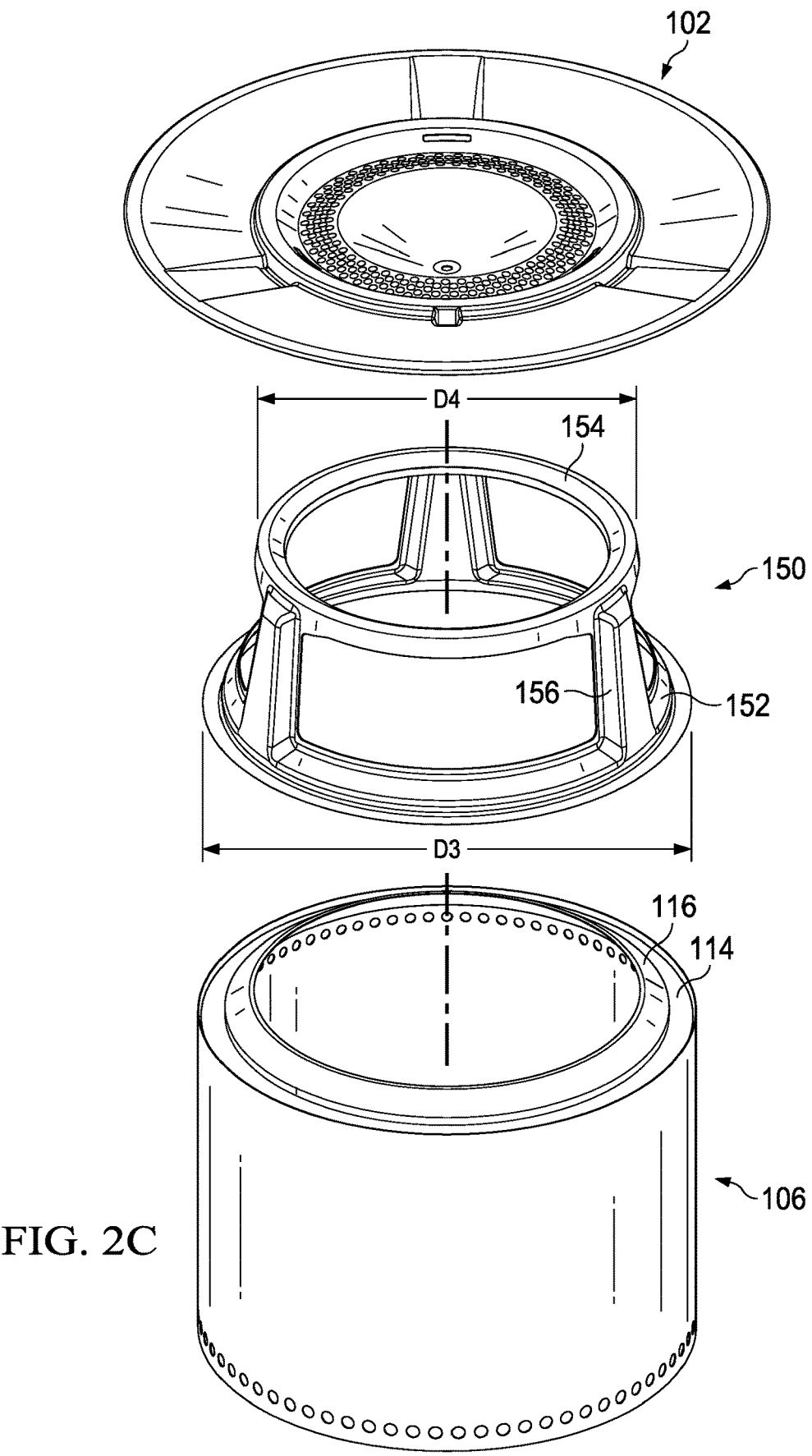

FIGS. 2A-2C are a side view, a perspective view, and an exploded perspective view, respectively, of an exemplary heat deflector installed on an exemplary fire pit using a central hub in accordance with some embodiments of the present disclosure. FIGS. 2A and 2B illustrate the heat deflector 102 installed on the fire pit 106 using a hub 150 instead of the removable legs 104, as illustrated in FIGS. 1A and 1B. The fire pit 106 has been described above with respect to FIGS. 1A and 1B. The hub 150 includes a bottom portion 152 and a top portion 154 and supports 156 connecting the bottom portion 152 and the top portion 154. The bottom portion 152 of the hub 150 has a diameter or width D3 that may be about 250 mm to about 750 mm. In some examples, the width D3 may be about 350 mm to about 675 mm. The top portion 154 of the hub 150 has a diameter or width D4 that may be smaller than the diameter or width D3 of the bottom portion 152. The diameter or width D4 may be about 200 mm to about 600 mm. In some examples, the width D4 may be about 275 mm to about 475 mm Larger and smaller dimensions are contemplated. In the depicted embodiment, there are three supports 156 connecting the bottom portion 152 to, and supporting, the top portion 154. In some embodiments, there may be more or fewer than three supports 156.

The raised ring 138 of the heat deflector 102 is designed to receive the hub 150 and rest on the hub 150 instead of using the removable legs 104 described above with respect to FIGS. 1A and 1B. In this configuration, the hub 150 sits on the fire pit 106 with the bottom portion 152 of the hub 150 resting on the connecting ring 114. The top lip 116 prevents the hub 150 from sliding off the fire pit 106. The heat deflector 102 sits on top of the hub 150 with the top portion 154 of the hub 150 fitting inside the raised ring 138 of the heat deflector. In some embodiments, the weight of the heat deflector 102 maintains the connection between the heat deflector 102 and the hub 150. The combined weight of the heat deflector 102 and the hub 150 maintain the connection between the hub 150 and the fire pit 106. In some other embodiments, the heat deflector 102 may be fastened to the hub 150 and the hub 150 may be fastened to the fire pit 106, such as with bolts or clips, for example. In some other embodiments, a combination of weight and fasteners may be used to install the heat deflector 102 on the fire pit 106.

FIG. 3 is a side view showing radiant energy deflected by the exemplary heat deflector 102 connected to an exemplary fire pit according to some embodiments of the present disclosure. In some embodiments, the heat deflector 102 is installed on the fire pit 106 using the removable legs 104. In some other embodiments, the heat deflector 102 is installed on the fire pit 106 using the hub 150. A person 302 is illustrated sitting next to the fire pit 106. Radiant energy 304 (e.g., heat) is shown rising vertically from the fire pit 106 and being laterally deflected by the heat deflector 102 towards the person 302. As discussed above, the angle α1 of the outer portion 130 of the heat deflector 102 may be selected to provide a suitable angle of incidence of the strongest source of radiant energy 304, and in some instance, maximizes the outer diameter or width of the fire pit 106 in relation to the specific location on the heat deflector 102. Similarly, the angle α3 of the inner portion 134 of the heat deflector 102 may be selected to provide suitable angle incidence of the strongest source of radiant energy 304, the middle of the fire pit 106, in relation to the specific location on the heat deflector 102. By so doing, the heat deflector 102 efficiently, horizontally redirects the vertically moving radiant energy 304 toward the person 302. Smoke 306 is shown passing through the plurality of holes 140 in the middle portion 134 of the heat deflector.

Figure 4A:
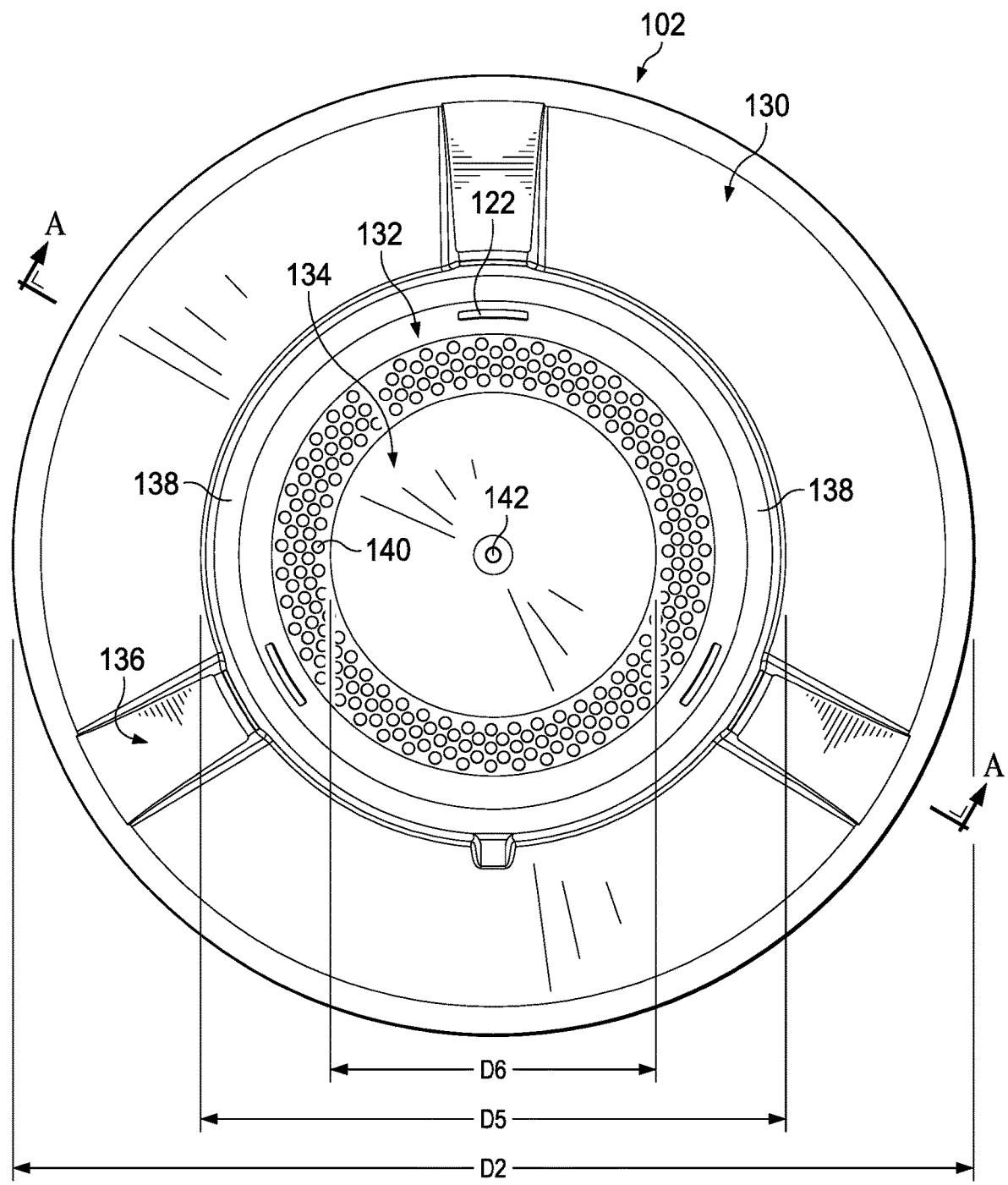
Figure 4D:
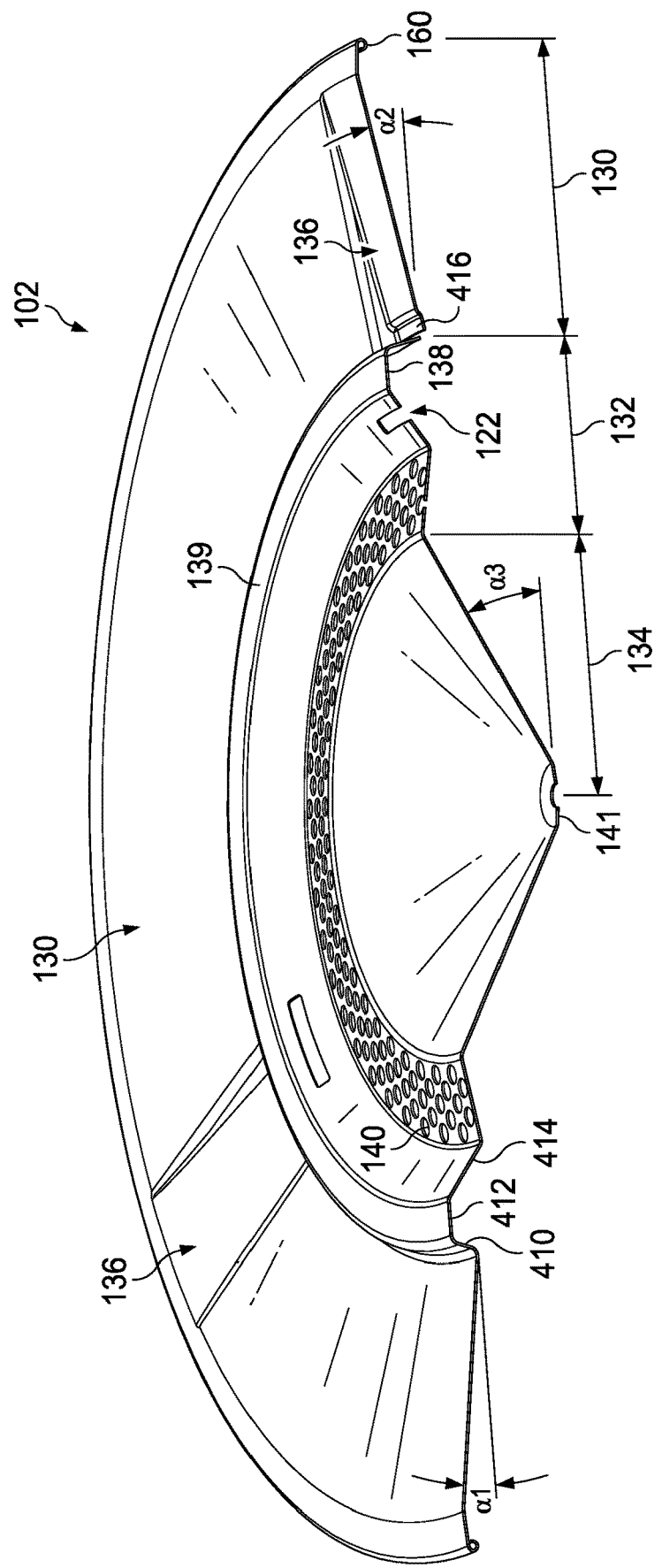
Figure 4E:
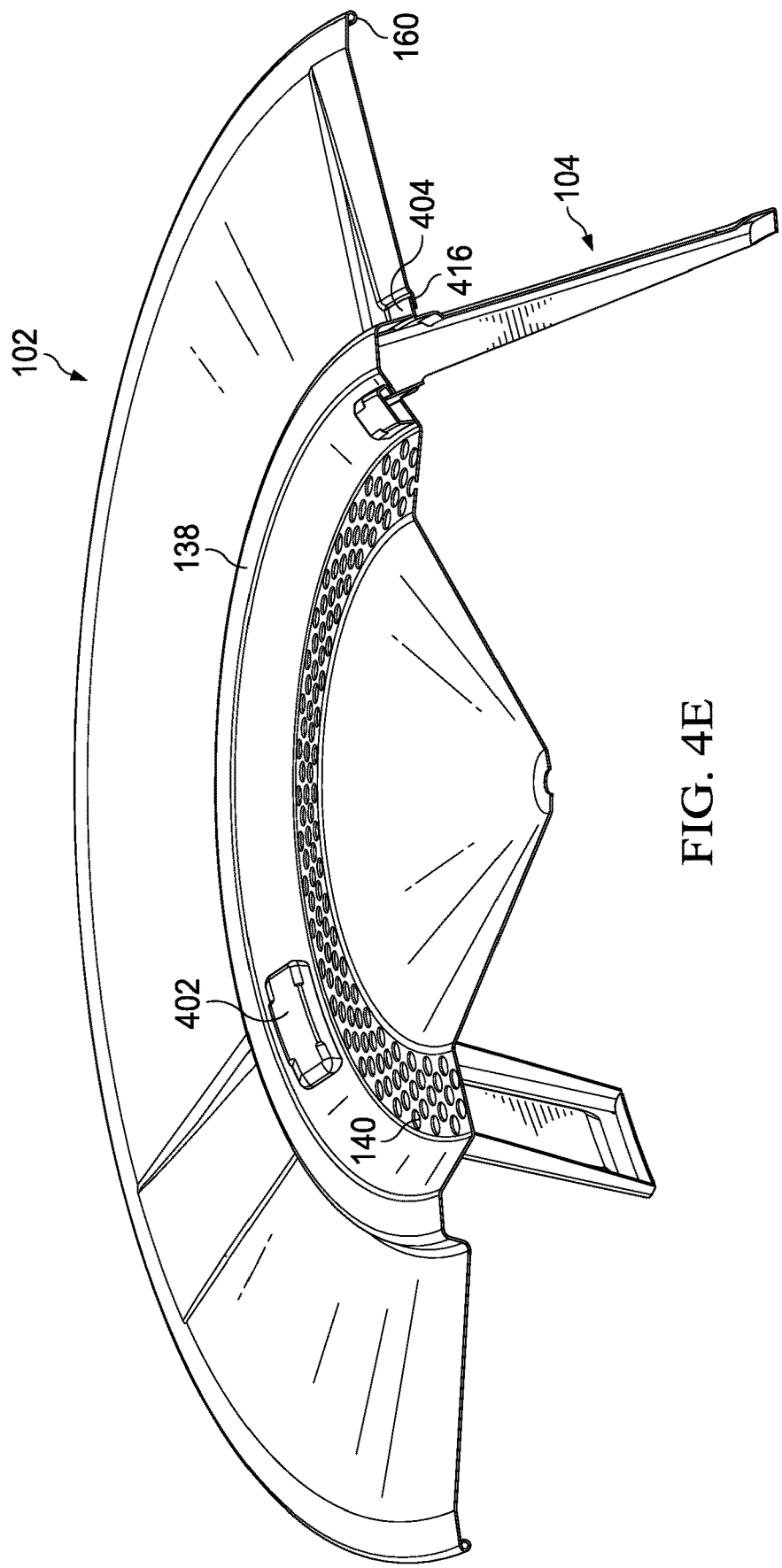

FIGS. 4A-4E are views of an example heat deflector with the removable leg components, according to some embodiments of the present disclosure. Specifically, FIG. 4A illustrates a top-down view of the heat deflector 102; FIG. 4B illustrates a perspective view of one removable leg 104; FIG. 4C illustrates a perspective view of a cap 402 used to secure the removable leg 104 to the heat deflector 102; FIG. 4D illustrates a perspective cross section view of the heat deflector 102 along line A-A without removable legs 104; and FIG. 4E illustrates a perspective cross section view of the heat deflector 102 along line A-A with the removable legs 104 attached to the heat deflector 102 using caps 402.

As discussed above, the heat deflector 102 includes the main body with the outer portion 130, the middle portion 132, and the inner portion 134. The outer portion, including the ribbed features 136, has diameter or width D2. The middle portion 132, including the plurality of holes 140 and the raised ring 138, has a diameter or width D5 that may be about 200 mm to about 600 mm. In some examples, the width D5 may be about 250 mm to about 5 500 mm. The inner portion has a diameter or width D6 that may be about 100 mm to about 350 mm. In some examples, the width D6 may be about 150 mm to about 225 mm Although larger and smaller widths are contemplated. The outer edge 160 of the outer portion 130, and thus the heat deflector 102, is folded over as illustrated in FIGS. 4D and 4E to form an edge lip. The folded structure of the outer edge 160 improves the structural and aesthetic of the heat deflector 102. The outer edge 160 improves the structural strength of the heat deflector 102 to resist warping and bending during repeated heating and cooling cycles. The outer edge 160 further provides a clean look to the heat deflector 102 as well as protects against sharp edges.

FIGS. 4D and 4E illustrate differences in angle α1 of the outer portion 130, angle α2 of the ribbed features 136, and angle α3 of the inner portion 134. As described above, the angles of the outer portion 130 and the inner portion 134 maximize the angle of incidence of the radiant energy rising from the fire pit 106.

FIG. 4B illustrates a perspective view of a removable leg 104. The removable leg 104 includes the upper portion 105, the lower portion 107, an upper support 404, and support features 406. The upper portion 105 may include one or more posts, or legs, that pass through the connection point 122 of the heat deflector 102. The upper portion 105 may lock, or snap, into the heat deflector. Alternatively, the cap 402, such as illustrated in FIG. 4C, may snap, or lock, onto the upper portion 105 of the removable leg 104 to secure the removable leg 104 to the heat deflector 102. The cap 402 may be curved to match the curve of the raised ring 138 to sit flush with the raised ring 138 of the heat deflector 102. The cap 402 snaps, or locks, onto the upper portion 105 of the removable leg 104. The bottom portion 107 of the removable leg 104 provides a footing for the heat deflector 102 when the removable leg 104 is installed in the heat deflector 102. The bottom portion 107 contacts the ground, the connecting ring 114, or other flat surface supporting the heat deflector 102. The upper support 404 interfaces with heat deflector 102 when the removable leg 104 is installed on the heat deflector 102.

FIGS. 4D and 4E further illustrate a cross section of the raised ring 138 having an outer vertical portion 410, a top horizontal portion 412, and a sloped inner portion 414. The outer vertical portion 410 and top horizontal portion 412 allow the heat deflector 102 to rest on the top portion 154 of the hub 150, as described above. The sloped inner portion 414 includes the connection points 122 to receive the upper portion 105 of removable leg 104. A catch feature 416 of the ribbed feature 136 receives the upper support 404 of the removable leg 104 during installation and while installed. The catch feature 416 may be a bent portion of the ring that allows the leg to connect thereto.

Figure 5C:
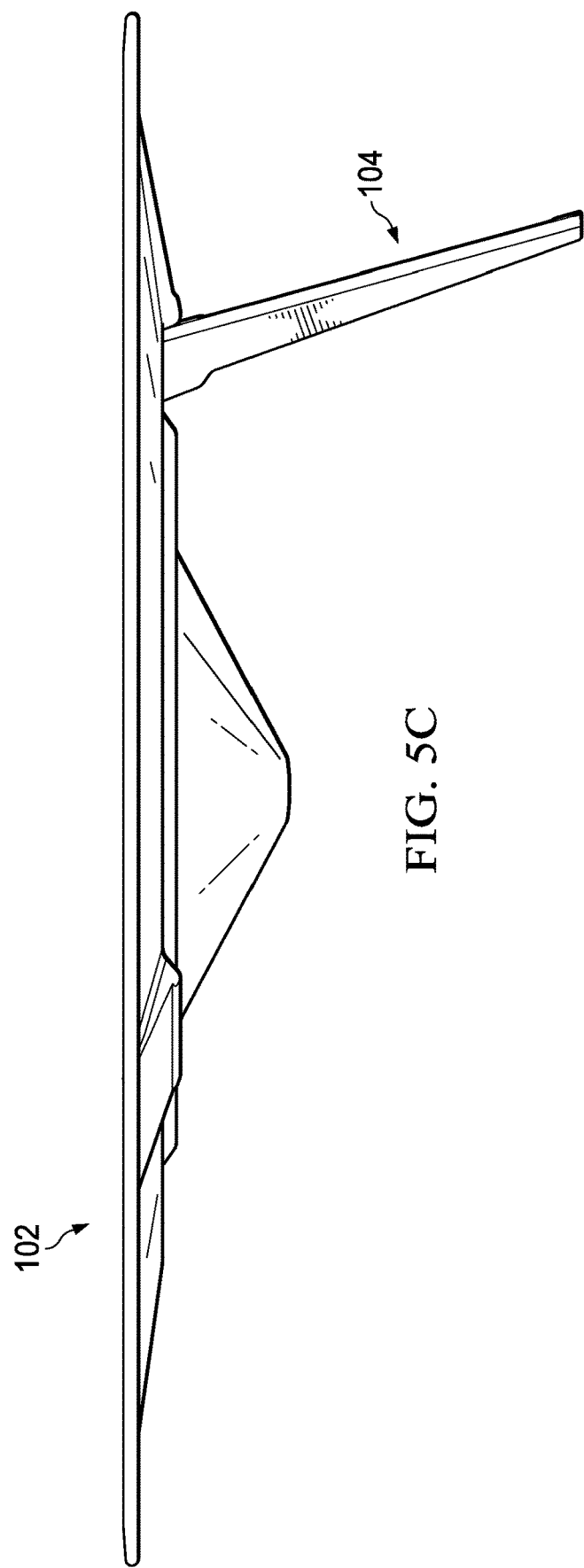
Figure 6A:
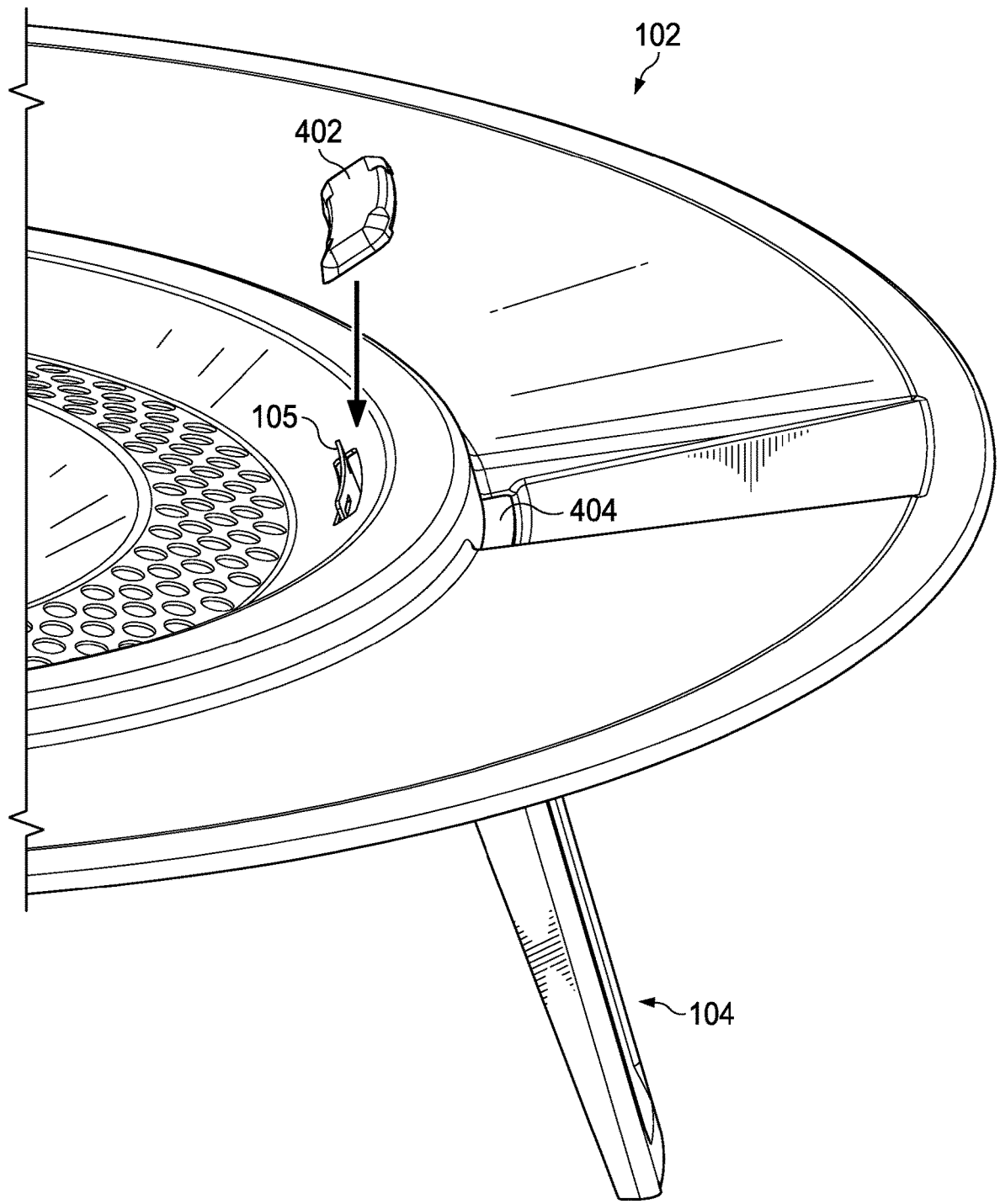
FIGS. 6A-6C are illustrative perspective views of securing a removable leg to a heat deflector, according to some embodiments of the present disclosure.

FIGS. 5A-5C and 6A-6C illustrate inserting the removable leg 104 into the heat deflector 102 and using the cap 402 to secure the removable leg 104 to the heat deflector 102. The process begins in FIG. 5A with a removable leg 104 and a heat deflector 102. The bottom portion 107 of the removable leg 104 is angled away from the center of the heat deflector 102 while the upper portion 105 of the removable leg 104 is angled toward the center of the heat deflector 102. The removable leg 104 is moved toward the connection point 122 and the catch feature 416 located on the underside of the heat deflector 102, specifically near the ribbed feature 136. At FIG. 5B, the upper support 404 of the removable leg 104 engages the catch feature 416, allowing the removable leg 104 to pivot about the catch feature 416. This places the upper portion 105 of the removable leg 104 adjacent the connection point 122. The removable leg 104 is then rotated clockwise, as indicated in FIG. 5B, so that the upper portion 105 of the removable leg 104 extends through the connection point 122 of the heat deflector 102, as shown in FIG. 6A. The upper support 404 maintains contact with the catch feature 416 throughout the rotation of the removable leg 104 thereby securing the removable leg 104 from falling down or over rotating during installation. As illustrated in FIG. 5C, the removable leg 104 is now in position within the heat deflector 102. A similar process is repeated for each of the removable legs 104 to be attached to the heat deflector 102. At this point, the heat deflector 102 may be able to stand using the removable legs 104.

Figure 6B:
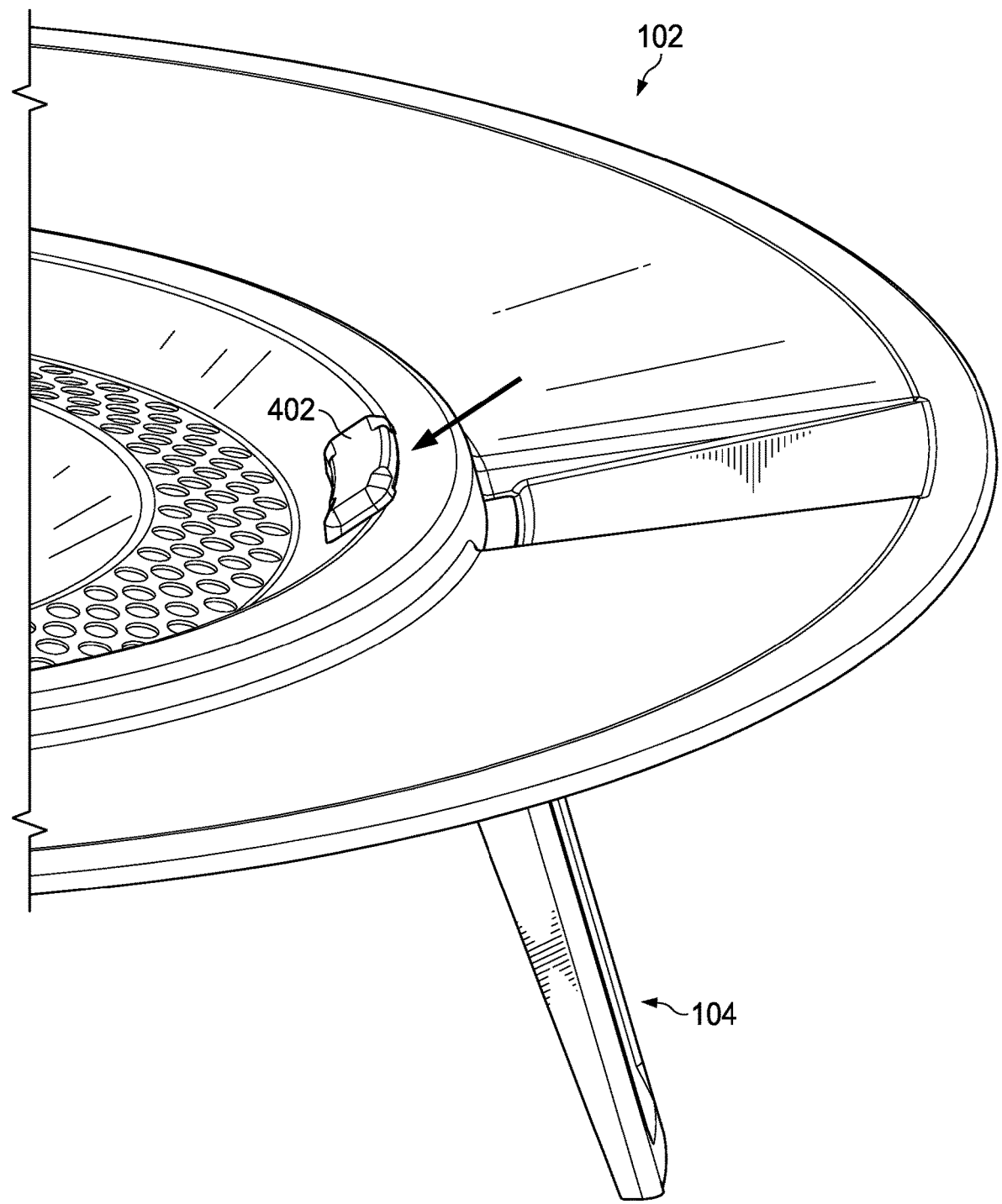
Figure 6C:
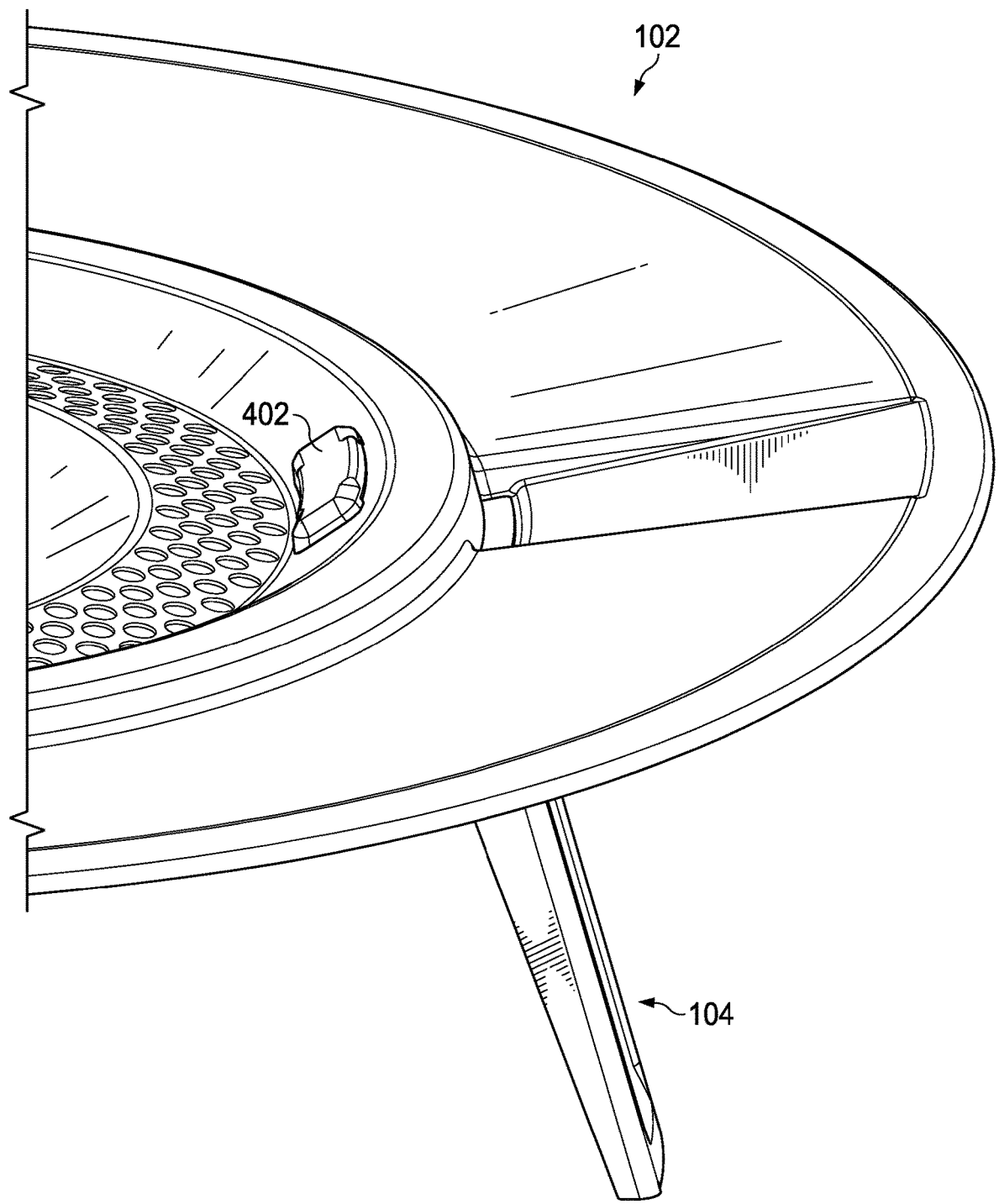

The installation process continues at FIG. 6A where a cap 402 is placed over the of the upper portion 105 of the removable leg 104. After placing the cap 402 over the upper portion 105, the cap 402 slides toward the center of the heat deflector 102 as illustrated in FIG. 6B. Sliding the cap 402 over the upper portion 105 engages the cap 402 to the upper portion 105 of the removable leg 104 preventing the removable leg 104 from rotating out of the connection point 122 and falling off the heat deflector 102. FIG. 6C shows the removable leg 104 completely installed in the heat deflector 102. The same process is repeated for each of the remaining removable legs 104.

Figure 7:
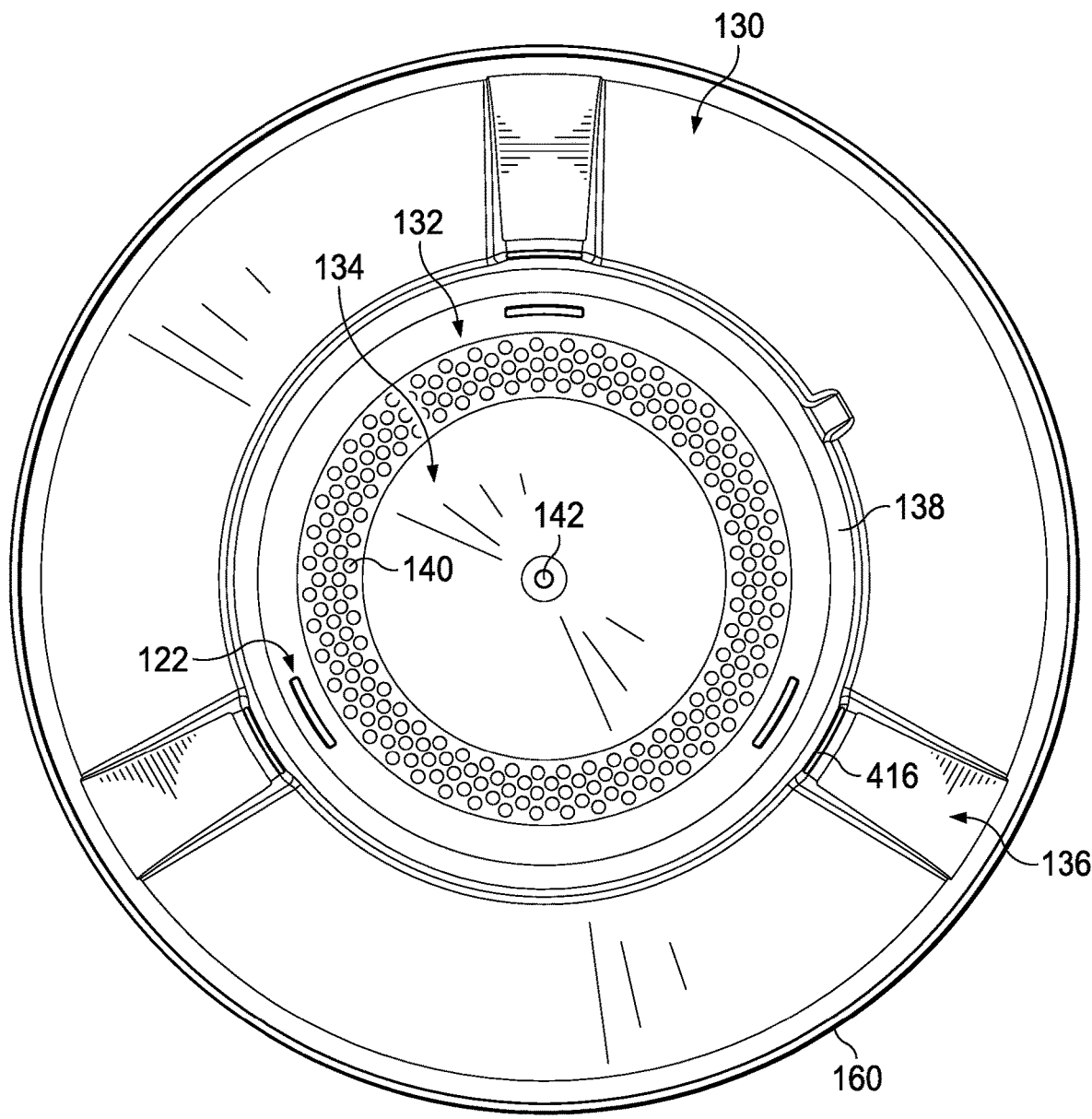
FIG. 7 is an illustrative bottom view of an example heat deflector, according to some embodiments of the present disclosure.

FIG. 7 shows a bottom view of an exemplary heat deflector. The heat deflector 102 includes the outer portion 130, the middle portion 132, and the inner portion 134. The outer edge of the outer portion 130 includes the fold of the outer edge 160. The ribbed features 136 are seen from beneath the heat deflector 102. Additionally, the catch feature 416 is seen from beneath the heat deflector 102. The middle portion 132 includes the raised ring 138 and the plurality of holes 140 as described above. The inner portion 134 includes the hole 142 at the vertex of the conical shape.

A number of variations are possible on the examples and embodiments described herein. For example, the fire pit, heat deflector, removable legs, hub, or other components could be made of heavier-gauge material in order to support more weight, or of lighter gauge material in order to become lighter and more portable. The heat deflector could be made in different sizes and/or with different degrees of curvature. Air gaps may be larger or smaller than shown herein, to optimize air flow through the fire pit, to minimize weight or volume of the fire pit, or for other reasons. The relative lengths, widths, and radii of different components could be different than presented herein. The fire pit, heat deflector, removable legs, hub, or other components could be made by different processes, including casting, forging, sintering, milling, or 3D printing. They could be made of different metals, or of nonmetallic materials such as ceramics. The fire pit rim could be noncircular, including such possible shapes as ovals, rectangles, triangles, and rhombuses. The technology described herein may be used to burn firewood, wood chips or pellets, scrap lumber, paper, cardboard, coal, and other combustible materials. It may be employed for example in lamps, stoves, fire pits, fireplaces, furnaces, forges, and boilers, and other combustion heaters. In some implementations, the fire pit, heat deflector, removable legs, hub, or other components may comprise several pieces that collectively form a structure like that described herein.

The logical operations making up the embodiments of the technology described herein are referred to variously as operations, steps, objects, elements, components, or modules. Furthermore, it should be understood that these may occur or be performed in any order, unless explicitly claimed otherwise or a specific order is inherently necessitated by the claim language.

Attached hereto is an Appendix that includes Figures A through K. Specifically, in several embodiments, one or more of the embodiments of the present application are provided in whole or in part as described and illustrated in the Appendix, which forms part of the present application. Moreover, Figures A through K provide additional support for any U.S. or non-U.S. design applications that are to be filed in the future claiming priority to this present U.S. utility patent application. More particularly, in the Appendix:

FIG. A is a top perspective view of a new, original design for a DEVICE FOR FIRE PIT according to a first embodiment;

FIG. B is a top view of the first embodiment;

FIG. C is a bottom view of the first embodiment;

FIG. D is a front view of the first embodiment;

FIG. E is a rear view of the first embodiment;

FIG. F is a left side view of the first embodiment;

FIG. G is a right side view of the first embodiment; and

FIG. H is a bottom perspective view of the first embodiment.

FIG. I is a top perspective view of the new, original design for a DEVICE FOR FIRE PIT according to a second embodiment, the second embodiment being identical to the first embodiment except that the second embodiment has an indeterminate diameter as indicated in FIG. I.

FIG. J is a view similar to FIG. D but with additional broken lines.

FIG. K is a view similar to FIG. D but with additional broken lines.

In several embodiments, one or more of the embodiments described and illustrated in the Appendix are combined in whole or in part with one or more of the embodiments described above, illustrated in one or more of FIGS. 1 through 16, one or more other embodiments described and illustrated in the Appendix, or any combination thereof.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the fire grate, ash pan, or fire pit. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the fire grate, ash pan, and fire pit as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A heat deflector to be used with a fire pit having a combustion chamber with an upward facing opening, the upward facing opening have an opening width, the heat deflector comprising:
a deflection panel having a panel width greater than the opening width of the fire pit, the deflection panel comprising:
a first portion having a first outer edge and a center region and a first radial width, and having a first heat-deflecting surface extending from the first outer edge to the center region, the first heat-deflecting surface sloping downward from the first outer edge toward the center region of the first portion at a first angle;
a second portion having a second inner edge and a second outer edge and a second radial width and including a plurality of ventilation openings therein, the second inner edge extending from the first outer edge of the first portion; and
a third portion having a third outer edge and a third inner edge and a third radial width greater than the second radial width, the third inner edge extending from the second outer edge of the second portion, the third portion having a second heat-deflecting surface extending from the third outer edge to the third inner edge at a second angle.

2. The heat deflector of claim 1, comprising:
a plurality of legs extending downward from the deflection panel and configured to support the deflection panel above the fire pit, each leg of the plurality of legs extending from the deflection panel at a location laterally outward of the first portion.

3. The heat deflector of claim 2, wherein each leg of the plurality of legs is removable from the deflection panel.

4. The heat deflector of claim 1, comprising:
a hub support configured to support the deflection panel above the combustion chamber of the fire pit.

5. The heat deflector of claim 4, wherein the hub support is a single piece component configured to rest on an upper edge of the fire pit and support a bottom of the deflection panel.

6. The heat deflector of claim 1, comprising a support system configured to support the deflection panel above the combustion chamber of the fire pit, the support system comprising a bottom portion and supports extending upward from the bottom portion toward the deflection panel to support the deflection panel above the combustion chamber of the fire pit.

7. The heat deflector of claim 6, wherein the bottom portion is a ring configured to surround the upward facing opening of the combustion chamber, the supports extending upward from the ring.

8. The heat deflector of claim 1, wherein the deflection panel is formed by a plurality of pieces joinable together by at least one of welds or fasteners.

9. The heat deflector of claim 1, wherein the deflection panel is formed of a single stamped piece of metal.

10. A heat deflector to be used with a fire pit having a combustion chamber with an upward facing opening, the upward facing opening have an opening width, the heat deflector comprising:
a deflection panel having a panel width greater than the opening width of the fire pit, the deflection panel comprising:
a first portion having a first outer edge and a first heat-deflecting surface sloping upward toward the first outer edge at a first angle, the first outer edge of the first portion having a first radial width smaller than the opening width of the fire pit;
a second portion having a second inner edge and a second outer edge and a second radial width and including a plurality of ventilation openings therein, the second inner edge formed by a bend at the first outer edge of the first portion; and
a third portion having a third outer edge and a third inner edge and a third radial width greater than the second radial width, the third inner edge formed by a bend at the second outer edge of the second portion, the third portion having a second heat-deflecting surface extending from the third outer edge to the third inner edge, the second heat-deflecting surface extending between the third outer edge and the third inner edge at a second angle.

11. The heat deflector of claim 10, comprising:
a plurality of legs extending downward from the deflection panel and configured to support the deflection panel above the fire pit, each leg of the plurality of legs extending from the deflection panel at a location laterally outward of the first portion.

12. The heat deflector of claim 11, wherein each leg of the plurality of legs is removable from the deflection panel.

13. The heat deflector of claim 10, wherein the third outer edge angles upwardly from the third inner edge to the third outer edge.

14. The heat deflector of claim 10, comprising a system having a support configured to support the deflection panel above the combustion chamber of the fire pit, the support comprising a bottom portion and supports extending upward from the bottom portion toward the deflection panel to support the deflection panel above the combustion chamber of the fire pit.

15. The heat deflector of claim 14, wherein the bottom portion is a ring configured to surround the upward facing opening of the combustion chamber, the supports extending upward from the ring.

16. The heat deflector of claim 10, wherein the deflection panel is formed by a plurality of pieces joinable together by at least one of welds or fasteners.

17. The heat deflector of claim 10, wherein the deflection panel is formed of a single stamped piece of metal.

18. A heat deflector to be used with a fire pit having a combustion chamber with an upward facing opening, the upward facing opening have an opening width, the heat deflector comprising:
a deflection panel comprising a plurality of pieces joinable together by at least one of welds or fasteners, the deflection panel having a panel width greater than the opening width of the fire pit, the deflection panel comprising:
a first portion having a first outer edge and a first radial width and a first heat-deflecting surface sloping upward toward the first outer edge at a first angle, the first outer edge of the first portion having a width smaller than the opening width of the fire pit;
a second portion having a second inner edge and a second outer edge and a second radial width and including a plurality of ventilation openings therein, the second inner edge formed by a bend at the first outer edge of the first portion; and
a third portion having a third outer edge and a third inner edge and a third radial width greater than the second radial width, the third inner edge formed by a bend at the second outer edge of the second portion, the third portion having a second heat-deflecting surface extending from the third outer edge to the third inner edge, the second heat-deflecting surface being oriented to deflect heat at a second angle.

19. The heat deflector of claim 18, comprising:
a plurality of legs extending downward from the deflection panel and configured to support the deflection panel above the fire pit, each leg of the plurality of legs extending from the deflection panel at a location laterally outward of the first portion.

20. The heat deflector of claim 19, wherein each leg of the plurality of legs is removable from the deflection panel.

21. The heat deflector of claim 18, wherein the third outer edge angles upwardly from the third inner edge to the third outer edge.

22. The heat deflector of claim 18, comprising a system having a support configured to support the deflection panel above the combustion chamber of the fire pit, the support comprising a bottom portion and supports extending upward from the bottom portion toward the deflection panel to support the deflection panel above the combustion chamber of the fire pit.

23. The heat deflector of claim 22, wherein the bottom portion is a ring configured to surround the upward facing opening of the combustion chamber, the supports extending upward from the ring.

24. A heat deflector to be used with a fire pit having a combustion chamber with an upward facing opening, the upward facing opening have an opening width, the heat deflector comprising:
a deflection panel having a panel width greater than the opening width of the fire pit, the deflection panel comprising:
a first portion having a first outer edge and a center region and a first radial width, and having a first heat-deflecting surface extending from the first outer edge to the center region, the first heat-deflecting surface sloping downward from the first outer edge toward the center region of the first portion;
a second portion having a second inner edge and a second outer edge and a second radial width and including a plurality of ventilation openings therein, the second inner edge extending from the first outer edge of the first portion; and
a third portion having a third outer edge and a third inner edge and a third radial width greater than the second radial width, the third inner edge extending from the second outer edge of the second portion, the third portion having a second heat-deflecting surface extending from the third outer edge to the third inner edge.

25. The heat deflector of claim 24, comprising:
a plurality of legs extending downward from the deflection panel and configured to support the deflection panel above the fire pit, each leg of the plurality of legs extending from the deflection panel at a location laterally outward of the first portion.

26. The heat deflector of claim 25, wherein each leg of the plurality of legs is removable from the deflection panel.

27. The heat deflector of claim 24, comprising a support system configured to support the deflection panel above the combustion chamber of the fire pit, the support system comprising a bottom portion and supports extending upward from the bottom portion toward the deflection panel to support the deflection panel above the combustion chamber of the fire pit.

28. The heat deflector of claim 24, wherein the deflection panel is formed by a plurality of pieces joinable together by at least one of welds or fasteners.

* * * * *